United States Patent
Nambiar et al.

(10) Patent No.: US 9,305,227 B1
(45) Date of Patent: Apr. 5, 2016

(54) HYBRID OPTICAL CHARACTER RECOGNITION

(71) Applicant: Amazon Technologies, Inc., Reno, NV (US)

(72) Inventors: Rakesh Madhavan Nambiar, Seattle, WA (US); Sonjeev Jahagirdar, Cambridge, MA (US); Matthew Joseph Cole, Medford, MA (US); Matias Omar Gregorio Benitez, Seattle, WA (US); Junxiong Jia, Mercer Island, WA (US); David Paul Ramos, Cambridge, WA (US)

(73) Assignee: Amazon Technologies, Inc., Reno, NV (US)

( * ) Notice: Subject to any disclaimer, the term of this patent is extended or adjusted under 35 U.S.C. 154(b) by 49 days.

(21) Appl. No.: 14/139,752

(22) Filed: Dec. 23, 2013

(51) Int. Cl.
*G06K 9/18* (2006.01)

(52) U.S. Cl.
CPC .............. *G06K 9/18* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,418,864 A * | 5/1995 | Murdock et al. | 382/309 |
| 2013/0084010 A1* | 4/2013 | Ross et al. | 382/182 |
| 2014/0078559 A1* | 3/2014 | Wu | G06K 9/00 358/452 |
| 2015/0049947 A1* | 2/2015 | Katsaros | G06K 9/00979 382/182 |

* cited by examiner

*Primary Examiner* — Atiba O Fitzpatrick
*Assistant Examiner* — Ryan P Potts
(74) *Attorney, Agent, or Firm* — Seyfarth Shaw LLP; Ilan N. Barzilay; Vamsi K. Kakarla

(57) ABSTRACT

Embodiments of the subject technology provide for a hybrid OCR approach which combines server and device side processing that can offset disadvantages of performing OCR solely on the server side or the device side. More specifically, the subject technology utilizes image characteristics such as glyph details and image quality measurements to opportunistically schedule OCR processing on the mobile device and/or server. In this regard, text extracted by a "faster" OCR engine (e.g., one with less latency) is displayed to a user, which is then updated by the result of a more accurate OCR engine (e.g., an OCR engine provided by the server). This approach allows factoring in additional parameters such as network latency and user preference for making scheduling decisions. Thus, the subject technology may provide significant gains in terms of reduced latency and increased accuracy by implementing one or more techniques associated with this hybrid OCR approach.

20 Claims, 8 Drawing Sheets

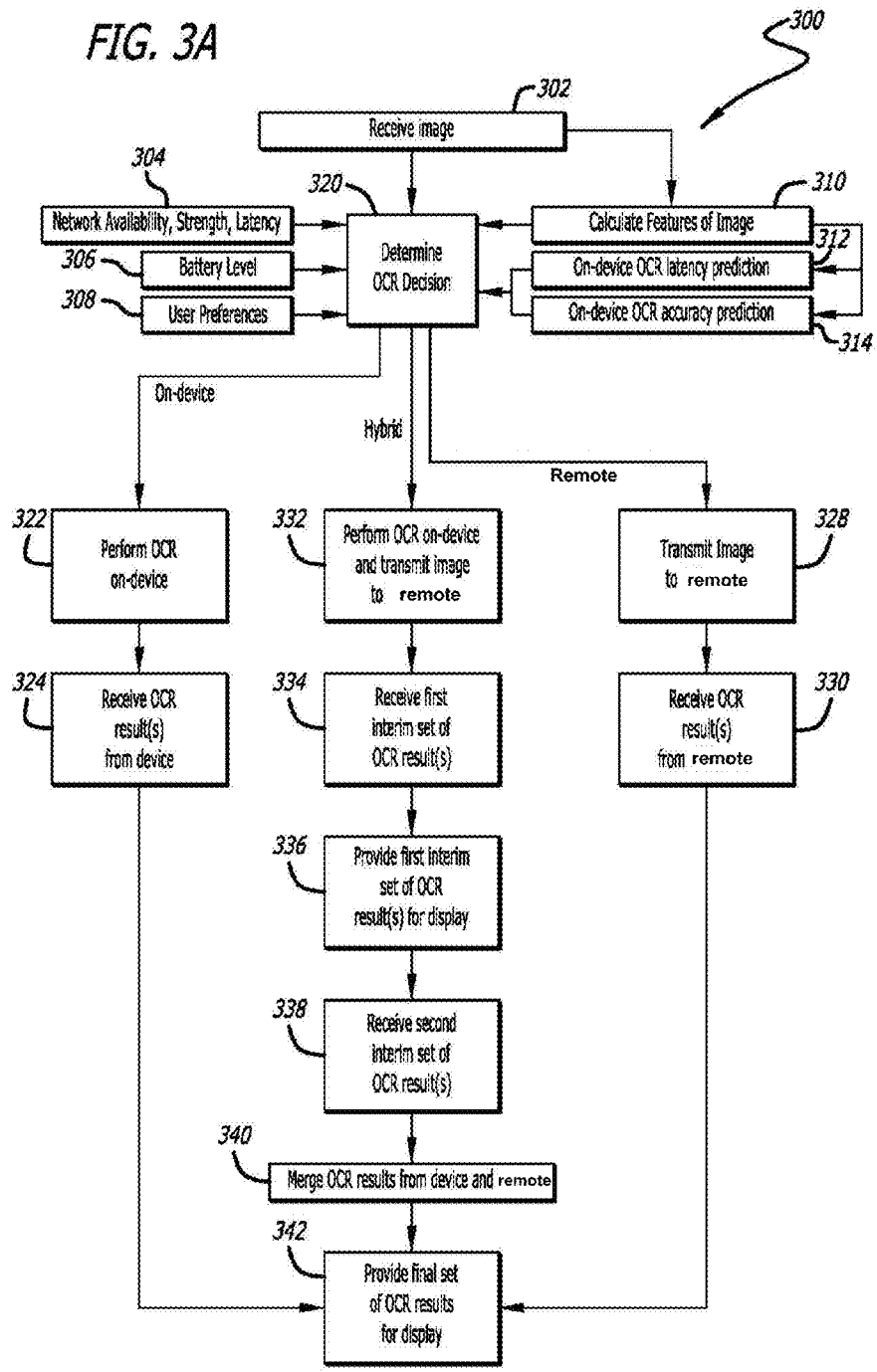

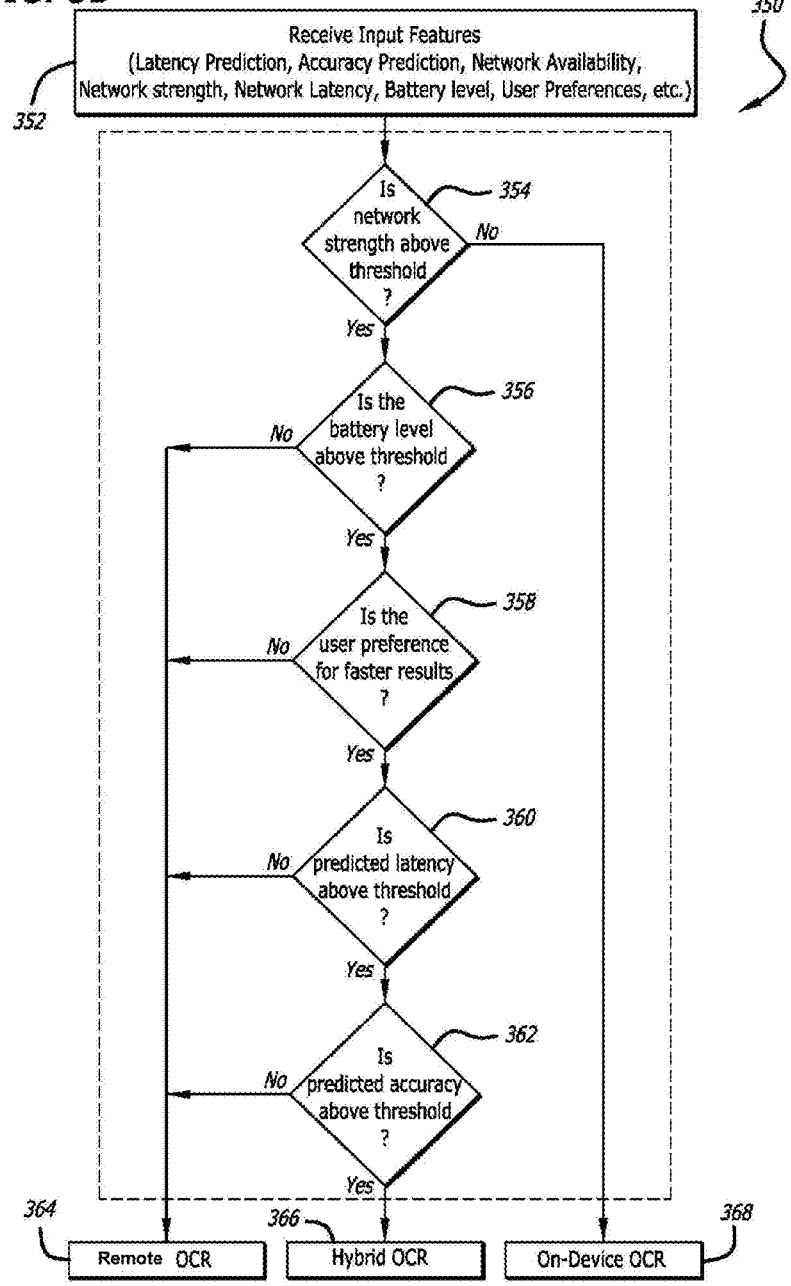

HYBRID OPTICAL CHARACTER RECOGNITION

BACKGROUND

Optical character recognition (OCR) may be utilized to convert image data (e.g., scanned images, photos, etc.) to machine-encoded data. For instance, by applying OCR, a scanned or camera-captured image may be converted into a machine-editable format that can be processed for storing, searching, editing or other purposes.

With the introduction of more powerful and capable mobile computing devices (e.g., smartphones, phablets, tablet computing devices, etc.), applications that were traditionally found on desktop computing devices or servers are being implemented for running on mobile computing devices. For a given OCR implementation adapted for use on a mobile computing device, a set of challenges are presented as mobile computing devices are used in different physical environments and have a more limited set of resources that may require a more efficient OCR implementation to optimally run on a given mobile computing device.

BRIEF DESCRIPTION OF THE DRAWINGS

Various embodiments in accordance with the present disclosure will be described with reference to the drawings, in which:

FIG. 3A illustrates steps of an example process for performing a hybrid OCR approach that utilizes local device and/or remote device processing in accordance with some embodiments of the subject technology;

FIG. 3B illustrates steps of an example process for determining an OCR decision that utilizes local device and/or remote side processing in accordance with some embodiments of the subject technology;

DETAILED DESCRIPTION

Systems and methods in accordance with various embodiments of the subject technology may overcome one or more deficiencies experienced in existing approaches to providing optical character recognition (OCR) in a mobile computing device.

Some existing approaches of OCR on a mobile computing device may leverage an OCR engine running solely on a remote device or solely on the mobile computing device. These approaches may impose limitations on processing latency and conversion accuracy.

The subject technology provides a novel hybrid OCR approach which combines the advantages of both remote device and device side processing while offsetting some of the disadvantages of performing OCR solely on the remote device side or the device side. More specifically, the subject technology utilizes image characteristics such as glyph details and image quality measurements to opportunistically schedule OCR processing on the mobile device and/or remote device. In this regard, text extracted by a "faster" OCR engine (e.g., one with less latency) is instantly displayed to a user which is then updated by the result of a more accurate OCR engine (e.g., an OCR engine provided by the remote device). This approach allows factoring in additional parameters such as network latency and user preference for making scheduling decisions. Additionally, sophisticated algorithms can be applied for displaying and merging results of the two aforementioned OCR engines. Overall, there may be significant gains in terms of reduced latency and increased accuracy by implementing one or more techniques associated with this hybrid OCR approach as described herein.

Figure 1A:
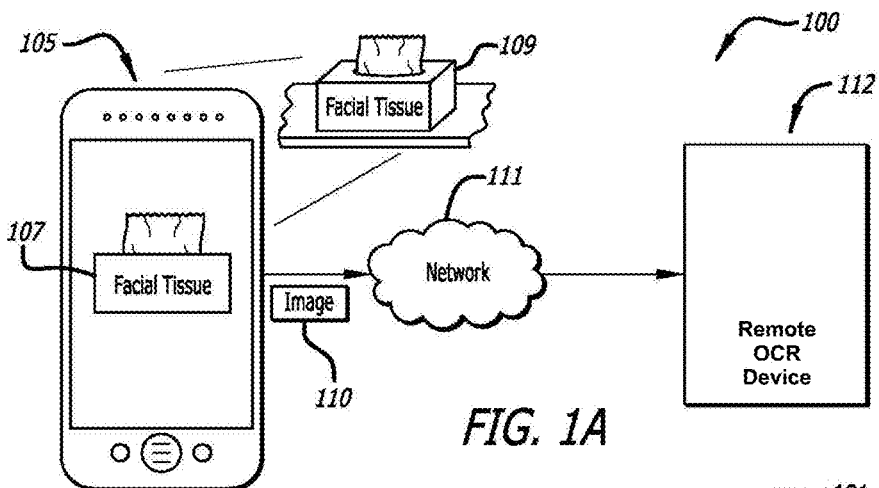
FIG. 1A conceptually illustrates a first stage of an example for performing optical character recognition utilizing a mobile computing device in conjunction with a remote device in accordance with some embodiments of the subject technology.

FIG. 1A conceptually illustrates an example 100 for performing optical character recognition utilizing a local process on a mobile computing device 105 in conjunction with a remote device. As used herein, a remote device may be any suitable device located remotely from a mobile computing device, such as one or more servers and/or other web based system. Although a mobile computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others. Additionally, it should be appreciated that for any process described herein, there can be additional, fewer, or alternative steps performed in similar or alternative orders, or in parallel and still be within the scope of the subject technology. Further, it should be understood that any process described herein may be executed asynchronously or substantially simultaneously with another process and still be within the scope of the subject technology.

As shown in FIG. 1A, a camera of the mobile computing device 105 captures an image 107 of an object 109. In the example of FIG. 1A, the object 109 includes a set of characters (e.g., "Facial Tissue") indicating a type of product. In some embodiments, the mobile computing device 105 performs a set of operations to determine whether to perform OCR recognition of the set of characters solely on the mobile computing device 105, solely at a remote OCR device 112, or on the mobile computing device 105 and the remote OCR device 112. In some examples, the remote OCR device 112 is configured to perform OCR on one or more images that are sent, over a network 111, to the remote OCR device 112 from a respective computing device(s). As used herein, a remote OCR device may be any suitable device located remotely from a mobile computing device, such as one or more servers and/or other web based system.

The mobile computing device 105 may perform a set of pre-processing operations in order to prepare the image 107 for performing OCR. By way of example, such pre-processing operations may include, but are not limited to, detecting a set of glyphs in the image 107, determining a set of characters respectively corresponding to the set of glyphs, removing one or more non-text features in the image 107 (e.g., noise, grain, etc.), and performing binarization of the image 107 by changing the image 107 to only include black and white colors (e.g., black text with a white background).

In some embodiments, after the set of pre-processing operations has been performed, the mobile computing device 105 may determine a set of features of the image 107. The set of features correspond to a set of OCR characteristics of the image 107 in some examples. For instance, a number of characters that appear in the image 107 may be determined or estimated. Other features may relate to size, shading, texture, color, brightness, etc. The mobile computing device 105 calculates an amount of latency based on the determined set of features. In this example, the amount of latency represents an amount of time before a user receives OCR data including one or more OCR results based on the image 107 from the remote OCR device 112. As used herein, OCR data, generated locally by a mobile computing device or remotely by a remote device, may include a set of OCR results. In some examples, the amount of latency may be based on one or more factors such as processor load, ping time, signal strength, etc. The mobile computing device 105 may also determine, based on the determined set of features, an indication of accuracy for performing OCR on the image 107 on the mobile computing device. In some embodiments, the indication of accuracy is a numerical score corresponding to an amount of accuracy of recognizing a set of characters in the image 107 for OCR performed on the image 107 on the mobile computing device 105.

In some embodiments, the mobile computing device 105 then determines whether the amount of latency is greater than a threshold amount of time. The threshold amount of time represents a period of time in which one or more OCR results will be returned by the mobile computing device 105 in one example (e.g., 750 ms). The threshold amount of time may be a predetermined amount of time, or variable amount of time based on one or more factors on the mobile computing device 105 (e.g., processor load, memory availability, etc.). Additionally, in some embodiments, the mobile computing device 105 may also determine whether the indication of accuracy is greater than a threshold indication of accuracy in which the threshold indication of accuracy represents a minimum amount of accuracy needed for confidence in recognizing a set of characters in the received image. Responsive to determining that the latency is greater than the threshold amount of time (e.g., indicating that it is likely that one or more OCR results will be returned by the mobile computing device 105 before the remote OCR device) and/or that the indication of accuracy is less than the threshold indication of accuracy (e.g., indicating that it is likely that the remote OCR device 112 will provide more accurate OCR results), the mobile computing device 105 initiates a hybrid OCR process by, first, performing OCR of the image 107 on the mobile computing device 105. Next, the mobile computing device 105, in a substantially simultaneous manner, sends an image 110 corresponding to the object 109, over the network 111, to the remote OCR device 112 for performing OCR on the image 110. In some embodiments, the image 110 represents a copy of the image 107.

In some embodiments, the mobile computing device 105 may forgo determining the set of features included in the image 107 in the manner described above when one or more mobile operational factors or conditions are met. By way of example, the mobile computing device 105 may checked for network connectivity and perform OCR on the mobile computing device 105 when there is no network connectivity or when network strength is below a network strength threshold. Further, a user preference(s) for performing OCR on the mobile computing device 105 or at the remote OCR device 112 may be check and the OCR performed based on such a user preference. Additionally, a battery level of the mobile computing device 105 may be determined and the OCR of the image 107 is performed by the remote OCR device 112 when the battery level is below a certain threshold battery level. It is appreciated that other types of mobile operational factors or conditions may be utilized and still be within the scope of the subject technology.

Figure 1B:
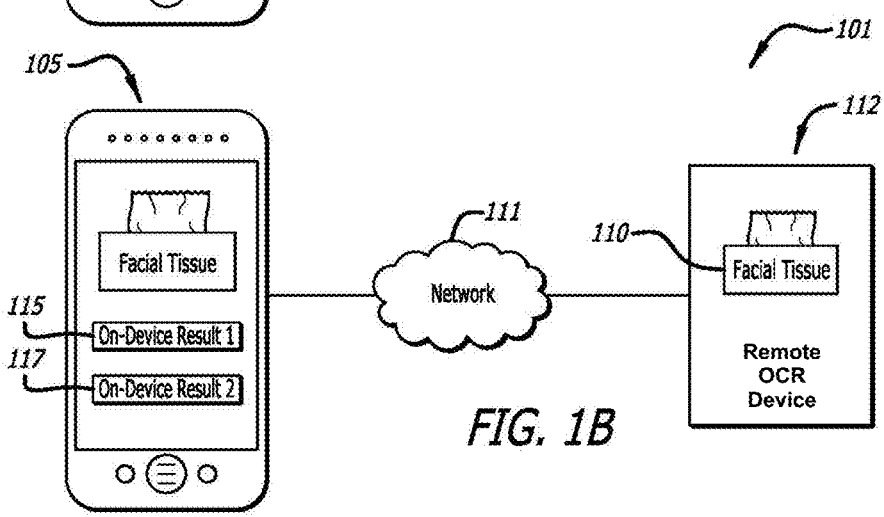
FIG. 1B conceptually illustrates a second stage of an example for performing optical character recognition utilizing the mobile computing device in conjunction with the remote device in accordance with some embodiments of the subject technology.

FIG. 1B conceptually illustrates an example 101 for performing optical character recognition utilizing a local process on the mobile computing device 105 in conjunction with a remote process on a remote device.

As illustrated in the example of FIG. 1B, the mobile computing device 105 receives OCR data including a set of OCR results including OCR result 115 and OCR result 117 from the OCR performed on the mobile computing device 105. OCR result 115 and OCR result 117 may represent an interim set of mobile OCR results before results are received from the remote OCR device 112. The mobile computing device 105 provides the OCR result 115 and the OCR result 117 for display on the mobile computing device 105. In some examples, each of the OCR results may include different data or content including, for example, text or a string corresponding to the characters that are recognized from the OCR performed on the image 107 and/or a link or uniform resource locator (URL) corresponding to a respective product(s) associated with the text. It is appreciated that other type of content (e.g., image, audio, video, etc.) may be included in a respect OCR result and still be within the scope of the subject technology. As further shown, the remote OCR device 112 performs OCR on the image 110.

Figure 1C:
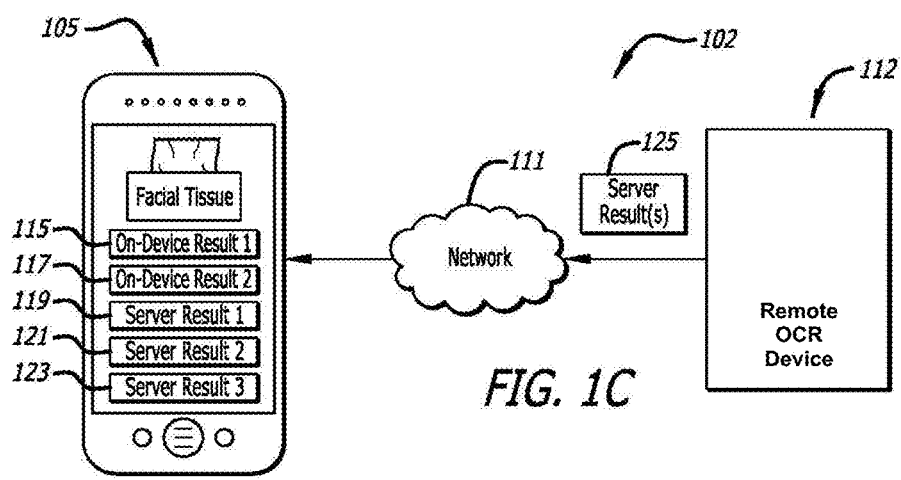
FIG. 1C conceptually illustrates a third stage of an example for performing optical character recognition utilizing the mobile computing device in conjunction with the remote device in accordance with some embodiments of the subject technology.

FIG. 1C conceptually illustrates an example 102 for performing optical character recognition utilizing a local process on the mobile computing device 105 in conjunction with a remote process on a remote device.

As illustrated in the example of FIG. 1C, the mobile computing device 105 receives, over the network 111 from the remote OCR device 112, OCR data including a set of OCR results 125 including OCR result 119, OCR result 121 and OCR result 123 from the OCR performed on the image 110 by the remote OCR device 112. OCR result 119, OCR result 121 and OCR result 123 may represent an interim set of remote OCR results. In this example, the mobile computing device 105 merges (e.g., combines) the OCR results 119, 121 and 123 with an existing set of results (e.g., the OCR results 115 and 117) and subsequently provides these OCR results for display (e.g., as a hybrid set of OCR results). In some embodiments, each of the OCR results shown in FIG. 1C is a different result.

Figure 2A:
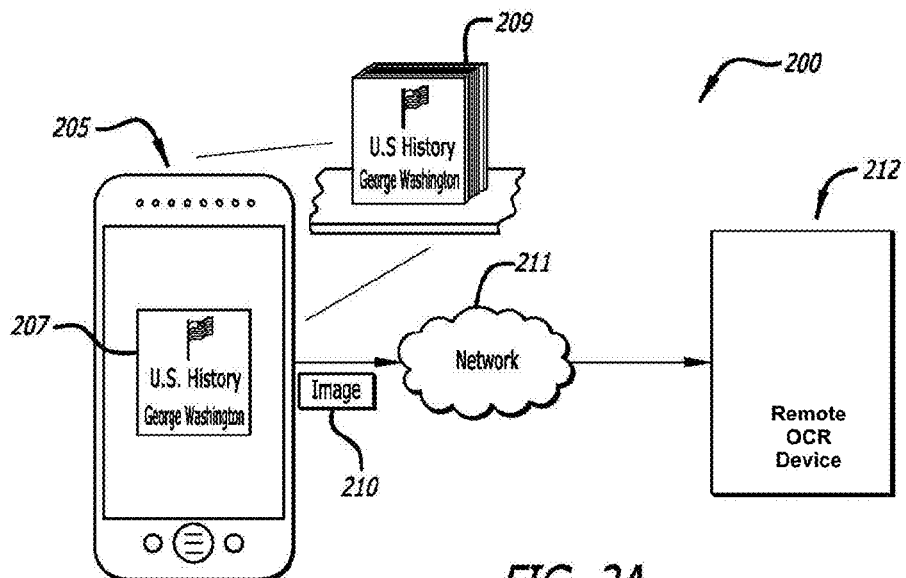
FIG. 2A conceptually illustrates a first stage of an example for performing optical character recognition utilizing a mobile computing device in conjunction with a remote device in accordance with some embodiments of the subject technology.

FIG. 2A conceptually illustrates an example 200 for performing optical character recognition utilizing a local process on a mobile computing device 205 in conjunction with a remote process on a remote device. More specifically, FIG. 2A illustrates a different example than the previous examples shown in FIGS. 1A-1C in which an image corresponding to an object with a different set of text (e.g., with more characters) undergoes OCR processing by the mobile computing device 205.

As shown in FIG. 2A, a camera of the mobile computing device 205 captures an image 207 of an object 209. In the example of FIG. 2A, the object 209 includes a set of characters (e.g., "U.S. History" and "George Washington"). Similar to the examples described in FIGS. 1A-1C, the mobile computing device 205 determines whether to perform OCR recognition of the set of characters solely on the mobile computing device 205, solely at an remote OCR device 212, or on the mobile computing device 205 and the remote OCR device 212. In some examples, the remote OCR device 212 is configured to perform OCR on one or more images that are sent, over a network 211, to the remote OCR device 212 from a respective computing device(s).

The mobile computing device 205 may perform a set of pre-processing operations in order to prepare the image 207 for performing OCR. As mentioned before, such pre-processing operations may include, but are not limited to, detecting a set of glyphs in the image 207, determining a set of characters respectively corresponding to the set of glyphs, removing one or more non-text features in the image 207, and performing binarization of the image 207 by changing the image 207 to only include black and white colors. It is appreciated that other types of pre-processing operations may be performed by the mobile computing device 205 and still be within the scope of the subject technology.

In some embodiments, after the set of pre-processing operations is performed, the mobile computing device 205 may determine a set of features of the image 207. As mentioned before, a number of characters that appear in the image 207 may be determined or estimated, and other features determined relating to size, shading, texture, color, brightness, etc. In the example of FIG. 2A, a respective number of characters in the image 207 is greater than a respective number of characters in the image 107 previously described in the examples of FIGS. 1A-1C. Moreover, respective sizes of the characters in the image 207, in this example, are smaller than respective sizes of the characters in the image 107 previously described in the examples of FIGS. 1A-1C.

The mobile computing device 205 then calculates an amount of latency based on the determined set of features. As mentioned before, the amount of latency represents an amount of time before the user receives one or more OCR results based on the image 207 from the remote device 212. The mobile computing device 205 also determines, based on the determined set of features, an indication of accuracy for performing OCR of the image 207 on the mobile computing device. As mentioned before, the indication of accuracy is a numerical score corresponding to an amount of accuracy of recognizing a set of characters in the image 207 for OCR performed on the image 207 on the mobile computing device 205

In some embodiments, the mobile computing device 205 then determines whether the amount of latency is greater than a threshold amount of time. The threshold amount of time represents a period of time in which one or more OCR results will be returned by the remote OCR device 212 in one example. In some embodiments, the threshold amount of time may be a predetermined amount of time, or variable amount of time based on one or more factors on the mobile computing device 205 (e.g., processor load, memory availability, etc.). Additionally, in some embodiments, the mobile computing device 205 may also determine whether the indication of accuracy is greater than a threshold indication of accuracy in which the threshold indication of accuracy represents a minimum amount of accuracy needed for confidence in recognizing a set of characters in the received image. Responsive to determining that the latency is greater than the threshold amount of time (e.g., indicating that it is likely that one or more OCR results will be returned by the mobile computing device 205 before the remote OCR device 212) and/or that the indication of accuracy is less than the threshold indication of accuracy (e.g., indicating that it is likely that the remote OCR device 212 will provide more accurate OCR results), the mobile computing device 205 initiates a hybrid OCR process by, first, performing OCR of the image 207 on the mobile computing device 205. Next, the mobile computing device 205, in a substantially simultaneous manner, sends an image 210 corresponding to the object 209, over the network 211, to the remote OCR device 212 for performing OCR on the image 210. In some embodiments, the image 210 represents a copy of the image 207.

Figure 2B:
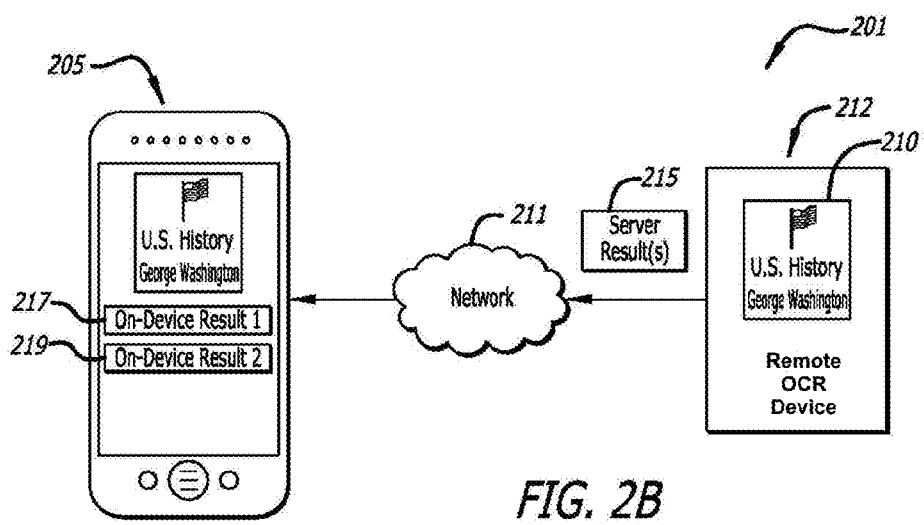
FIG. 2B conceptually illustrates a second stage of an example for performing optical character recognition utilizing the mobile computing device in conjunction with the remote device in accordance with some embodiments of the subject technology.

FIG. 2B conceptually illustrates an example 201 for performing optical character recognition utilizing a local process on the mobile computing device 205 in conjunction with a remote process on a remote device.

As illustrated in the example of FIG. 2B, the mobile computing device 205 receives OCR data including a set of OCR results including OCR result 217 and OCR result 219 from the OCR performed on the mobile computing device 205. OCR result 217 and OCR result 219 may represent an interim set of mobile OCR results before results are received from the remote OCR device 212. The mobile computing device 205 provides the OCR result 217 and the OCR result 219 for display on the mobile computing device 205. As mentioned before, each of the OCR results may include different content including text corresponding to the characters that are recognized from the OCR performed on the image 207 and/or a link or uniform resource locator (URL) corresponding to a respective product(s) associated with the text. It is appreciated that other type of content (e.g., image, audio, video, etc.) may be included in a respect OCR result and still be within the scope of the subject technology.

As further shown, the remote OCR device 212 performs OCR on the image 210 and sends a set of OCR results 215, over the network 211, to the mobile computing device 205. The remote OCR device 212, in some embodiments, has additional computing resources than what is available on the mobile computing device 205 and may execute more complex and computationally intensive OCR algorithm(s) on the image 210 that may likely produce more accurate OCR results than the OCR results provided by the mobile computing device 205.

Figure 2C:
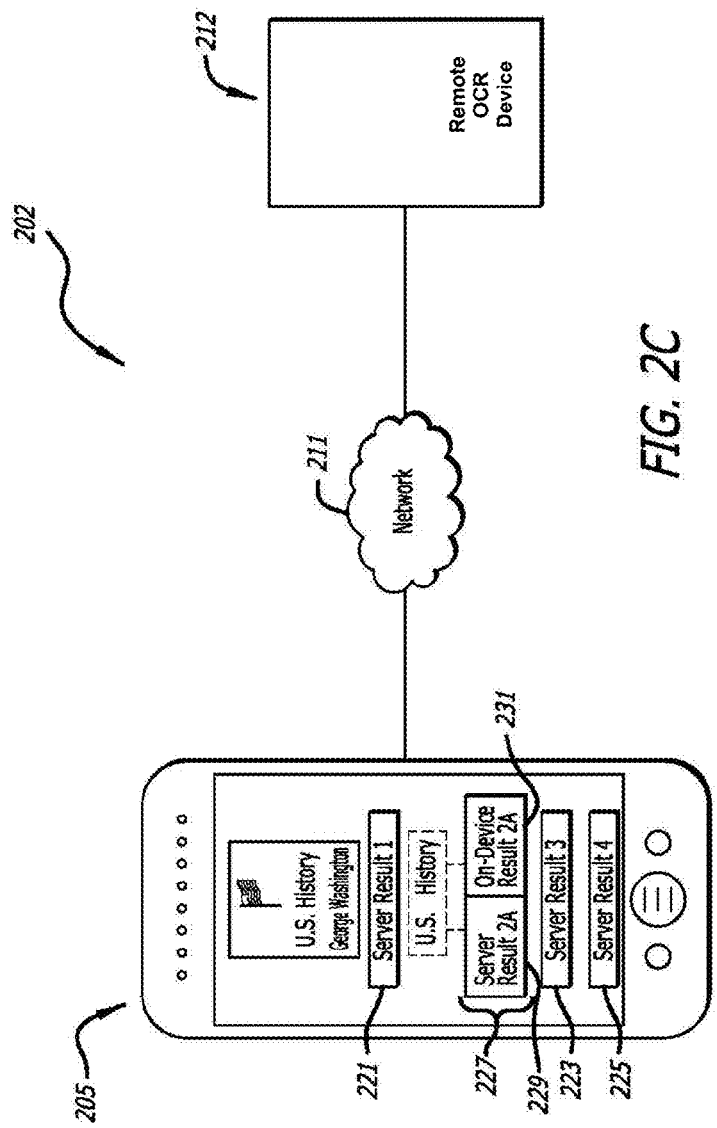
FIG. 2C conceptually illustrates a third stage of an example for performing optical character recognition utilizing the mobile computing device in conjunction with the remote device in accordance with some embodiments of the subject technology.

FIG. 2C conceptually illustrates an example 202 for performing optical character recognition utilizing a local process on the mobile computing device 205 in conjunction with a remote process on a remote device. More specifically, the third stage 202 illustrates a subsequent stage that occurs after the stage 201 illustrated in FIG. 2B.

As illustrated in the example of FIG. 2C, the mobile computing device 205 has merged the set of OCR results from the OCR performed by the mobile computing device with a set of OCR results received, over the network 211, from the remote OCR device 212. In this regard, the mobile computing device 205 has provided the OCR results 221, 227, 223 and 225 for display. As shown, the OCR results 221, 223 and 225 correspond to respective OCR results from the remote OCR device 212. In merging the OCR results, the mobile computing device 205 has replaced the OCR result 217 shown in FIG. 2B with the OCR result 221 based on a comparison of respective confidence scores of the OCR result 221 and the OCR result 217 when the respective OCR results are the same or similar (e.g., same or similar text that is recognized). In some embodiments, each OCR result is associated with a respective confidence score that indicates a measure or metric of accuracy performed by the OCR (e.g., either performed by the mobile computing device or by the remote OCR device). In one example, assuming the OCR result 221 and OCR result 217 include the same or similar recognized text/characters, the OCR result 217 is replaced when the OCR result 221 has a higher confidence score than the OCR result 217. As a result, the mobile computing device displays the OCR result 221 instead of the OCR result 217. Additionally, in some embodiments, each of the OCR results 221, 223 and 225 shown in FIG. 2C are different results (e.g., not the same or similar text/characters).

As further illustrated in the example of FIG. 2C, the mobile computing device 205 provides for display an OCR result 227 that represents a merged result including a portion of a respective OCR result 229 from the remote OCR device 212 and a portion of a respective OCR result 231 from the mobile computing device 205. In this regard, the mobile computing device 205 has merged a set of characters corresponding to "U.S." from the portion of the respective OCR result 229 with a set of characters (e.g., a word) corresponding to "History" from the portion of the respective OCR result 231. By way of example, the mobile computing device 205 may have determined that the OCR result 229 corresponding to "U.S." had a higher confidence score than a corresponding portion of an OCR result from the mobile computing device 205 that included the OCR result 231, and replaced that portion accordingly to produce the merged OCR result 227.

FIG. 3A illustrates steps of an example process 300 for performing a hybrid OCR approach that utilizes local device and/or remote device processing in accordance with some embodiments of the subject technology. In some embodiments, the process 300 may be implemented by one or more computing devices or systems (e.g., a mobile computing device). More specifically, for improving the latency in which one or more OCR results are provided to a user, the process 300 illustrates an example implementation of a hybrid approach for OCR by determining whether to perform OCR on a given image solely at a computing device, solely at a remote device, or both at the computing device and the remote device based on one or more conditions and/or metrics. It should be appreciated that for any process described herein, there can be additional, fewer, or alternative steps performed in similar or alternative orders, or in parallel and still be within the scope of the subject technology.

At step 302, an image from a camera of a mobile computing device is received at the mobile computing device. In some embodiments, the mobile computing device may determine to perform OCR on the image solely at the mobile computing device or solely at a remote OCR device when one or more mobile operational factors are met. As used herein, "mobile operational factors" is a genus phrase for the factors discussed at least in FIG. 3A (e.g., 304, 306 and 308, etc.). The remote OCR device, in some examples, is any suitable device such as one or more servers and/or other web based system that may be remotely located over a network (e.g., the Internet, LAN, WLAN, etc.) and is configured to perform OCR on an image that is received from a given mobile computing device(s) (e.g., via a transmission from the mobile computing device, over the network, to the remote OCR device).

In the example of FIG. 3A, a set of mobile operational factors corresponding to network availability, strength, and latency 304, battery level 306 and user preferences 308 may be used to determine an OCR decision (e.g., to perform OCR via on-device, hybrid, or remote device processing) at 320. Further, a set of inputs corresponding to calculated features of the image 310, on-device latency prediction 312, and on-device OCR accuracy prediction 314 may be used to determine the OCR decision at 320 (as described further below).

In some embodiments, the set of mobile operational factors may be initially checked to determine the type of OCR processing to perform (e.g., on-device, remote, or hybrid). A set of different network characteristics including, but not limited to, network availability, network strength and/or network latency may be checked to determine the OCR decision. For example, in cases in which no network connection is available, network strength is too low, or network latency is too high, the mobile computing device at step 320 may forgo remote OCR processing and instead perform OCR solely at the mobile computing device.

At step 304, the mobile computing device determines whether a network connection is available on the mobile computing device or an indication of network strength is above a threshold amount of network strength at the system. The indication of network strength represents an amount of signal strength from the system to the network in some examples. Additionally, at step 304, a network latency may be compared a threshold network latency that represents a maximum amount of latency for OCR to be performed by the remote OCR device. Responsive to determining that the network connection is unavailable, network strength is below the threshold amount of network strength, or the network latency is higher than the threshold network latency (or any combination thereof of the aforementioned network factors) at step 304, the mobile computing device determines an OCR decision at step 320 to perform OCR solely on the mobile computing device. OCR is then performed on the image by the mobile computing device at step 322. Next, at step 324, a respective set of OCR results from the OCR performed on the mobile computing device is received. At step 342, the mobile computing device causes the respective set of OCR results to be displayed.

If at step 304 a network connection is available, the network strength is above a threshold amount of network strength at the system, or the network latency is lower than the threshold network latency, the mobile computing device at step 306 determines whether a battery level of the mobile computing device is below a threshold amount of battery level. In some cases, when the battery level of the mobile computing device is too low, a decision can be made to solely perform OCR of the image at the remote OCR device in order to preserve the battery level. Responsive to determining that the battery level of the mobile computing device is below the threshold amount of battery level at step 306, the mobile computing device at step 320 determines an OCR decision to solely perform OCR at the remote OCR device. Next, the mobile computing device at step 328 sends the received second image, over the network, to the remote OCR device for performing OCR on the image. At step 330, the mobile computing device receives, over the network, a respective set of OCR results from the remote OCR device based on the previously sent image. At step 342, the mobile computing device causes the respective set of OCR results from the remote OCR device to be displayed.

In some embodiments, if the battery level of the mobile computing device is at least at the threshold amount of battery level at step 306, the mobile computing device determines at step 308 whether a user preference indicates a preference for performing OCR at the mobile computing device or at the remote OCR device. By way of example, such a user preference(s) may be stored as part of a user profile. In another example, a set of options with or without respective graphical elements (e.g., a slider, toggle switch, etc.) may be provided to allow the user to set a preference for performing OCR at the mobile computing device or at the remote OCR device. In a case in which the user preference at step 308 indicates that OCR should be performed at the mobile computing device, the mobile computing device determines an OCR decision at step 320 to solely perform OCR at the mobile computing device. Next, the steps 322, 324 and 342 may be performed as described before. Alternatively, in a case in which the user preference indicates that OCR should be performed at the remote OCR device, the mobile computing device determines an OCR decision at step 320 to solely perform OCR at the remote OCR device. Next, the steps 328, 330 and 342 may be performed as described before.

Although different mobile operational factors are described above as being checked in a given sequence, it is appreciated that the mobile computing device may consider only one, several, or many different operational conditions, in any suitable order, to determine an OCR decision, and that any operational condition(s) may be checked in any order, in parallel, asynchronously, etc. Further, any other suitable operational condition than those described herein may be utilized and still be within the scope of the subject technology.

In some embodiments, after the aforementioned conditions/factors described at 304, 306 and/or 308 (e.g., network characteristics, battery level, user preference(s), etc.) are checked and are indicated to be satisfied, at step 310, the mobile computing device may determine a set of features of the image. In this regard, the set of features may correspond to a set of OCR characteristics for text included in the image such as, but not limited to, size, color, shape, texture, brightness, contrast, a number of characters/glyphs, etc.

At step 312, the mobile computing device calculates an amount of latency based on the determined set of features. In some cases, the amount of latency represents an amount of time before a user receives one or more OCR results based on the image from a remote device. By way of example, if the image includes complex features or a high number of potential characters, the amount of latency may be directly impacted (e.g., latency is increased). Further, unfavorable network conditions may increase the amount of latency. It is appreciated that the amount of latency may be a predetermined amount of time or a variable amount based on one or more factors (e.g., image features, image quality, network conditions, etc.). The amount of latency may be compared to a threshold amount of latency to determine, in part, an OCR decision as described further below.

At step 314, the mobile computing device determines, based on the determined set of features, an indication of accuracy for performing OCR on the image on the mobile computing device. In some examples, the indication of accuracy comprises a numerical score corresponding to an amount of accuracy of recognizing a set of characters in the image for OCR performed on the image on the mobile computing device. For example, the indication of accuracy may be determined based on brightness levels, contrast levels, color distribution, size of text, or other image characteristics, etc. An image with more uniform levels of contrast or brightness, or includes larger text, could be easier to more accurately recognize characters from the text included therein.

In some embodiments, the mobile computing device determines whether the amount of latency from step 312 is greater than a threshold amount of time. In some examples, the threshold amount of time represents a second amount of time in which one or more OCR results will be returned by the mobile computing device when OCR is performed locally. Responsive to determining that the latency is greater than the threshold amount of time, the mobile computing device determines whether the indication of accuracy from step 314 is greater than a threshold indication of accuracy. In some examples, the threshold indication of accuracy represents a minimum amount of accuracy needed for confidence in recognizing a set of characters in the image. Responsive to determining that the above-mentioned amount of latency is less than the threshold amount of time, the mobile computing device determines an OCR decision at step 320 to perform OCR solely at the remote OCR device. Next, the mobile computing device sends the image, over the network, to the remote OCR device for performing OCR on the image at step 328, and then receives, over the network, at step 330 a respective remote set of OCR results from the remote OCR device based on the sent image. At step 342, the mobile computing device causes the respective remote set of OCR results to be displayed on the mobile computing device.

Alternatively, when the indication of accuracy from step 314 is greater than the threshold indication of accuracy, the OCR decision is made at step 320 to perform hybrid OCR processing by performing OCR locally on the mobile computing device and also sending the image over to the remote OCR device for performing OCR.

At step 332, the mobile computing device performs OCR on the set of features of the image on the mobile computing device, and sends the image, over the network, to the remote OCR device for performing OCR on the image. At step 334, the mobile computing device receives an interim set of mobile OCR results from the mobile computing device.

At step 336, the mobile computing device causes the interim set of mobile OCR results to be displayed on the mobile computing device. Example displays of OCR results are shown in FIGS. 1B and 2B. At step 338, the mobile computing device receives, over the network, a remote interim set of OCR results from the remote OCR device based on the image.

At step 340, the mobile computing device merges the interim set of mobile OCR results and the remote interim set of OCR results into a hybrid set of OCR results. For instance, the mobile computing device determines differences between the interim set of mobile OCR results and the remote interim set of OCR results, and then merges the differences between the interim set of mobile OCR results and the remote interim set of OCR results into a hybrid set of OCR results. A technique for merging the respective OCR results (e.g., when received in such an asynchronous manner) is described in further detail in FIG. 4 below.

At step 342, the mobile computing device causes the hybrid set of OCR results to be displayed on the mobile computing device. Example displays of OCR results are shown in FIGS. 1C and 2C.

Although the above example describes that OCR results are first received from the mobile computing device, it should be understood that the respective OCR results from the mobile computing device and the remote OCR device may be received asynchronously in some examples (e.g., the remote OCR results received first, and then the local OCR results from the mobile computing device).

As mentioned before, although a mobile computing device (e.g., a smartphone, an electronic book reader, or tablet computer) is described in FIG. 3, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

FIG. 3B illustrates steps of an example process 350 for determining an OCR decision that utilizes local device and/or remote side processing in accordance with some embodiments of the subject technology. In some embodiments, the process 350 may be implemented by one or more computing devices or systems (e.g., a mobile computing device). More specifically, for improving the latency in which one or more OCR results are provided to a user, the process 350 illustrates an example implementation by determining based on one or more operational conditions whether to perform OCR on a given image solely at a computing device, solely at a remote device, or both at the computing device and the remote device based on one or more conditions and/or metrics. More specifically, in some embodiments, the operations described in FIG. 3B may be performed by the mobile computing device at step 320 by reference to FIG. 3A to determine an OCR decision.

At step 352, a set of input features (e.g., as described in FIG. 3A above) is received. At step 354, the mobile computing device determines whether an indication of network strength is above a threshold amount of network strength in which the indication of network strength represents an amount of signal strength from the mobile computing device to the network. If not above the threshold amount of network strength, on-device OCR (e.g., at the mobile computing device) is then performed at step 368.

Responsive to determining that the indication of network strength is above the threshold amount of network strength at step 354, the mobile computing device at step 356 determines whether a battery level of the mobile computing device is above a threshold amount of battery level. If not above the threshold amount of battery level, remote OCR is then performed at step 364.

Responsive to determining that the battery level of the mobile computing device is above the threshold amount of battery level at step 356, the mobile computing device at step 358 determines whether a user preference indicating a preference for performing OCR on the mobile computing device exists (e.g., for faster results). If the user preference does not exist at step 358, remote OCR is then performed at step 364.

Responsive to determining that the user preference indicating the preference for performing OCR on the mobile computing device does exist at step 358, the mobile computing device at step 360 determines whether an amount of latency is greater than a threshold amount of time. As discussed before, the amount of latency represents a first amount of time before a user receives one or more OCR results based on the image from the remote OCR device, and the threshold amount of time represents a second amount of time in which one or more OCR results will be returned by the mobile computing device. If the amount of latency is less than the threshold amount of time at step 360, remote OCR is then performed at step 364.

Responsive to determining that the latency is greater than the threshold amount of time at step 360, the mobile computing device at step 362 determines whether the indication of accuracy is greater than a threshold indication of accuracy. As mentioned before, the threshold indication of accuracy represents a minimum amount of accuracy needed for confidence in recognizing a set of characters in the image. When the indication of accuracy is greater than the threshold indication of accuracy at step 362, the OCR decision is made to perform hybrid OCR at step 366. If the indication of accuracy is less than the threshold indication of accuracy, remote OCR is performed at step 364.

It should be appreciated that the example operations included in FIG. 3B may include additional or fewer operational conditions and/or factors to be checked and still would be within the scope of the subject technology.

Figure 4:
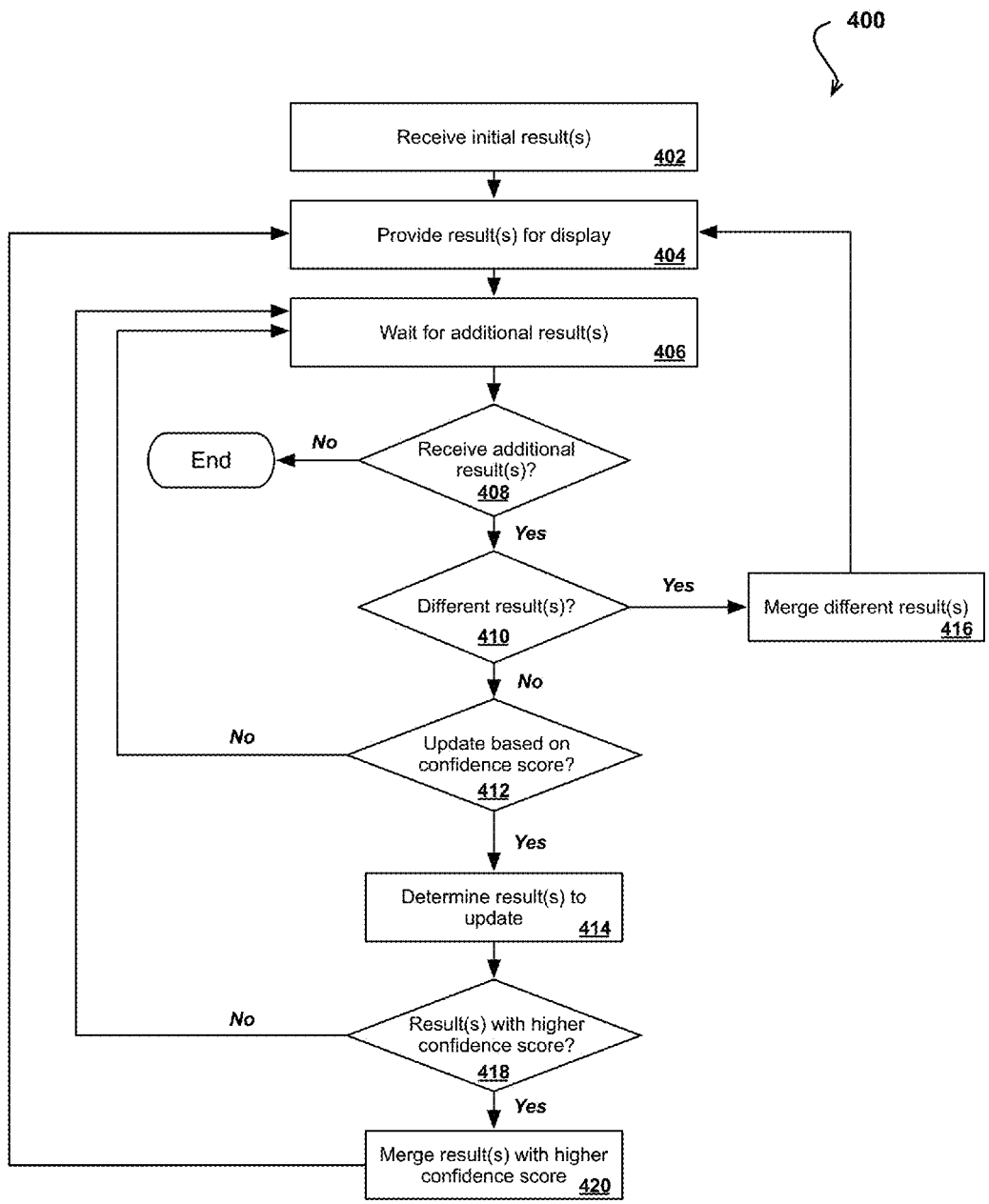
FIG. 4 illustrates steps of an example process for merging OCR data from a local computing device and/or remote device that can be used in accordance with some embodiments of the subject technology.

FIG. 4 illustrates steps of an example process 400 for merging OCR data from a local computing device and/or remote device that can be used in accordance with some embodiments of the subject technology. In some embodiments, the process 400 may be implemented by one or more computing devices or systems (e.g., a mobile computing device). A mobile computing device may execute the process 400 conjunctively with the process 300 described in FIG. 3 in some examples (e.g., as part of a set of operations for merging OCR results at step 340).

The example process 400 may also be implemented to merge respective OCR results for a single image into a hybrid set of OCR results. However, in some instances, a user may capture multiple images of a given object over a span of time (e.g., three images captured no more than 500 ms apart). Thus, multiple sets of OCR results may be merged and provided for display to the user as a hybrid set of OCR results. It is therefore appreciated that the process 400 may be implemented by the mobile computing device to merge respective OCR results for single and/or multiple images of a given object(s).

At step 402, the mobile computing device receives an initial set of OCR results for OCR performed on a given image (or associated with an image from a set of images that are taken over a span of time as described above). In some examples, the set of OCR results are received from OCR performed by the mobile computing device. Alternatively, the set of OCR results are received, over a network, from the remote OCR device (e.g., when the OCR is performed by the remote OCR device).

At step 404, the mobile computing device provides the initial set of OCR results for display on the mobile computing device. Example displays of initial results are shown in FIGS. 1B and 2B.

At step 406, the mobile computing device may wait for one or more additional OCR result(s) to be returned by, for example, the remote OCR device (or the mobile computing device in cases where initial result(s) are received from the remote OCR device). In some examples, the mobile computing device may wait for a period of time based on a predetermined timeout period (e.g., 30 seconds, 60 seconds, 5 minutes, etc.). In some embodiments, if the timeout period expires without receiving any additional OCR result(s), the mobile computing device may end the process 400. As another example, the mobile computing device may wait until the remote OCR device sends an indication that it has completed its OCR task(s) based on the image(s) provided by the mobile computing device and/or that all remotely generated OCR results have been provided to the mobile computing device.

When a set of additional OCR results are received at step 408, differences between the initial set of OCR results and the additional set of OCR results may then be determined at step 410. For instance, the mobile computing device determines whether at least one OCR result from the set of additional OCR results is different than the set of initial OCR results. In some examples, this determination can be made by determining that an (entire) OCR result from the set of additional OCR results has not been included in the initial set of OCR results based on a comparison with each of the initial OCR results. Responsive to determining that at least one OCR result is different at step 410 (e.g., wholly unique based on an entirety of the OCR result), the mobile computing device at step 416 merges the at least one different OCR result in the initial set of OCR results by performing an additive merge to generate a hybrid set of OCR results. In some embodiments, assuming the initial set of OCR results is provided as a list or similar form, merging the at least one OCR result with the initial set of OCR results is accomplished by appending (e.g., adding) the at least one OCR result to the initial set of OCR results. After merging the results from step 416, the mobile computing device then at step 404 provides this hybrid set of OCR results for display on the mobile computing device. An example display of a hybrid set of OCR results is shown in FIG. 1C. The mobile computing device may then continue to wait for additional results at step 406 and then perform one or more of the subsequent steps thereafter.

If none of the additional result(s) is considered different at step 410, the mobile computing device at step 412 performs a set of operations to determine whether to update any of the initial set of OCR results based on a confidence score(s) as described below.

In some embodiments, the initial set of OCR results is first compared to a threshold confidence score at step 412. The threshold confidence score may represent an acceptable or minimum level of accuracy for keeping OCR results from the initial set of OCR results. In such cases, the mobile computing device may analyze the initial set of OCR results to determine respective confidence scores. If none of the confidence scores of OCR results are below the threshold confidence score, then the mobile computing device may forgo updating any OCR results from the initial set of OCR results and continue to step 406 to wait for more additional OCR results (or end the process 400 altogether in some embodiments, such as when the mobile computing devices determines all possible OCR results from an image have been analyzed and/or the remote OCR device indicates it has analyzed and reported on all possible OCR results from the image).

If at least one OCR result is below the above-mentioned threshold confidence score, the mobile computing device may continue to determine which OCR result(s), if any, from the initial set of OCR results to update at step 414. In some embodiments, the mobile computing device determines whether at least one OCR result is a similar or same OCR result as one or more respective OCR results from the initial set of OCR results. To determine whether one OCR result is the same or similar to another OCR result, a string metric may be determined that measures similarity or dissimilarity (distance) between two text strings (e.g., strings associated with the two respective OCR results) for approximate string matching or comparison. In one example, the strings "myemail@foobar.org" and "mymeail@foobar.org" can be considered to be similar. Additionally, such a string metric may include a number indicating a degree of similarity. In some examples, a string metric called a Levenshtein distance may be determined. The Levenshtein distance is determined based on two input strings, and a score equivalent to a number of substitutions and deletions needed in order to transform one input string into the other input string is provided. In this regard, a respective OCR result with a smaller Levenshtein distance score with another OCR result may be considered more similar to the other OCR result. Further, it should be understood that two respective OCR results that have a Levenshtein distance score of zero ("0") may be considered a same or identical string.

In some embodiments, for each respective OCR result from the additional OCR result(s) that is determined to be similar or the same with one or more initial OCR results, the mobile computing device at step 418 determines whether the respective OCR result has a higher confidence score than the initial OCR result. As mentioned before, in some embodiments, each OCR result is associated with a respective confidence score that indicates a measure or metric of accuracy performed by the OCR (e.g., either performed by the mobile computing device or by the remote OCR device). For instance, a respective confidence score of 0.9 may indicate a relative higher degree of OCR accuracy than another confidence score of 0.2.

In some embodiments, a confidence score may be determined at step 418 on a per-character basis (e.g., each character in an OCR result may include a confidence score) or on a per-word basis (e.g., each word in an OCR result may include a confidence score) for determining a set of characters and/or words to replace. For example, the mobile computing device may compare the confidence score of first letters "o" and m" from a mobile OCR result of "omnkey" to the confidence scores of second letters "m" and "o" from a remote OCR result of "monkey" and determine that the confidence scores of the second letters are each greater than the corresponding confidence scores of the first letters at step 418. A similar comparison may be made by comparing the confidence scores of the words "omnkey" and "monkey" and determining that the confidence score of "monkey" is greater than "omnkey" at step 418.

If no respective OCR result (or portion thereof) from the additional set of OCR results is determined to have a higher confidence score at step 418, the mobile computing device continues to step 406 to wait for more additional OCR result(s).

If at least one OCR result has a higher confidence score at step 418, for each respective OCR result that has a higher confidence score than a corresponding similar or same initial OCR result, the mobile computing device at step 420 merges the OCR result with the higher confidence score by replacing the initial OCR result with the respective OCR result with the higher confidence score to provide a hybrid set of OCR results. In this manner, the mobile computing device may update a set of OCR results that are provided for display to the user with a more accurate OCR result(s).

Further, in some embodiments, one or more characters may be swapped or replaced from a given set of OCR results when the mobile computing device performs merging at step 420. As discussed before, the mobile computing device determines one or more first characters, from at least one OCR result of the initial OCR results, that have a lower confidence score than a confidence score of one or more second characters from at least one respective OCR result of the received OCR results. The mobile computing device then replaces the one or more first characters from the at least one OCR result of the initial OCR results with the one or more second characters. The mobile computing device then merges at step 420 the initial OCR results including the one or more second characters to include in a hybrid set of OCR results.

Additionally, in some embodiments, one or more words may be replaced from a given set of OCR results when the mobile computing device performs merging at step 420. As discussed above, the mobile computing device determines one or more first words, from at least one OCR result of the initial OCR results, that have a lower confidence score than a confidence score of one or more second words from at least one respective OCR result of the received OCR results. The mobile computing device replaces the one or more first words from the at least one OCR result of the initial OCR results with the one or more second words. The mobile computing device then merges at step 420 the initial OCR results including the one or more second words to include in a hybrid set of OCR results.

After merging OCR results at step 420, the mobile computing device returns to step 404 to provide the hybrid set of OCR results for display on the mobile computing device. An example display of a hybrid set of OCR results is shown in FIG. 2C. The mobile computing device may then wait for additional OCR result(s) at step 406. As mentioned before, one or more OCR results may be received asynchronously (e.g., at different times) as OCR processing on the mobile computing device and/or remote OCR device may return OCR result(s) at varying times. Next, at step 408, the mobile computing device determines if other additional OCR results are received. If no other OCR results are received at step 408 (e.g., after a timeout period expires), the process 400 then ends. Alternatively, if there are more OCR result(s) that are received at step 408, the process 400 continues to step 410 and the mobile computing device may repeat the subsequent steps as described above on the subsequent additional set of OCR results.

Figures 5A, 5B:
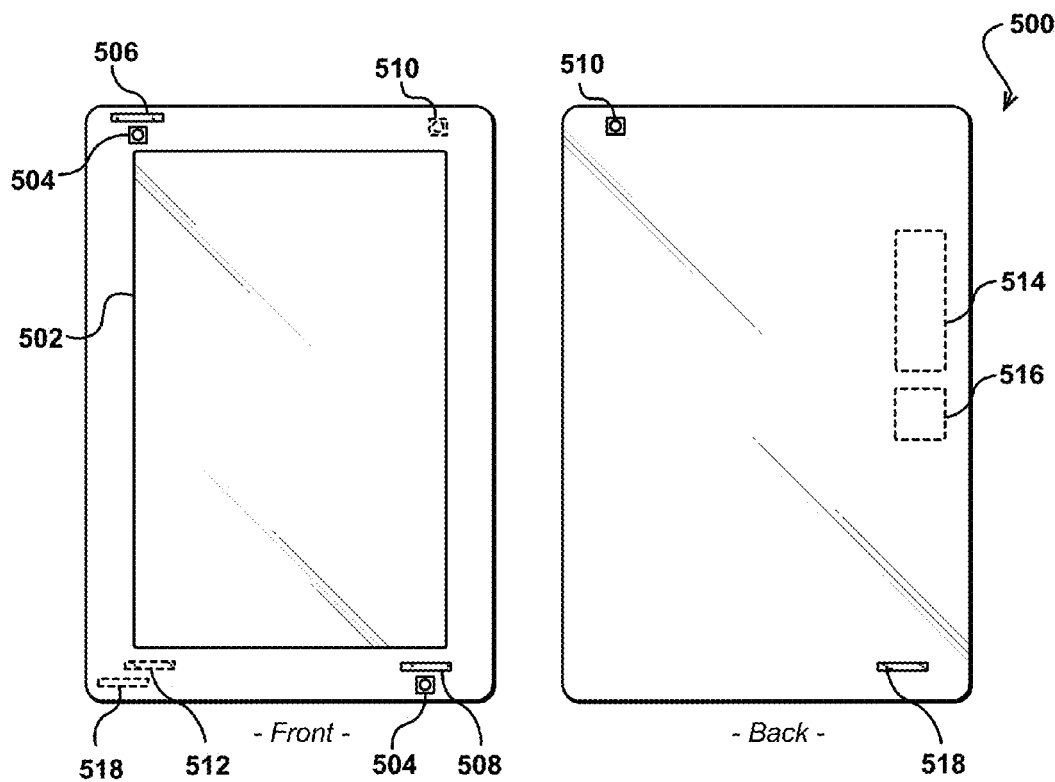
FIGS. 5A and 5B illustrate front and back views, respectively, of an example electronic computing device that can be used in accordance with various embodiments.

FIGS. 5A and 5B illustrate front and back views, respectively, of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one computing mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
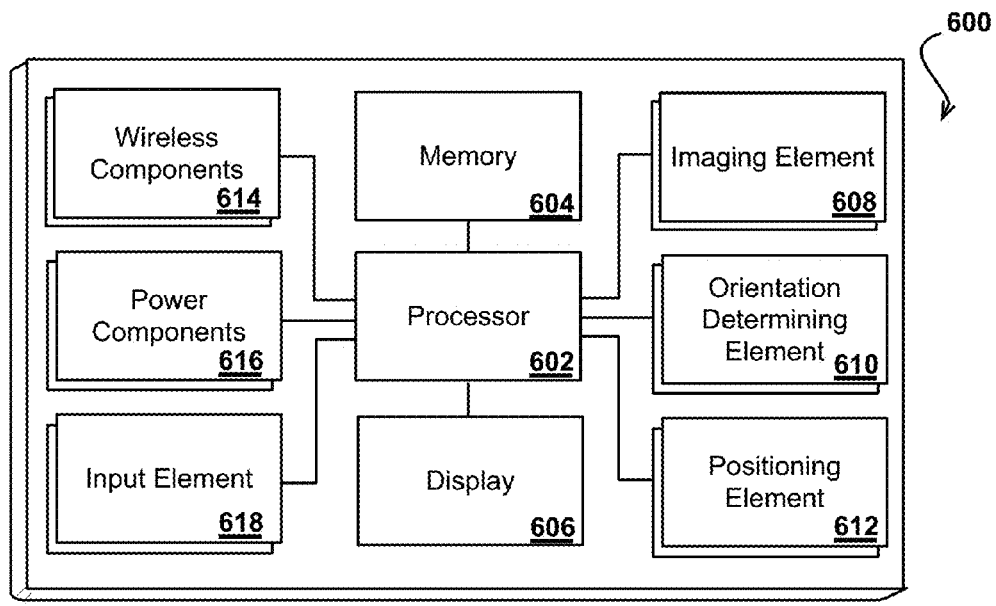
FIG. 6 illustrates a set of basic components of an electronic computing device such as the device described with respect to FIGS. 5A and 5B.

FIG. 6 illustrates a set of basic components of an electronic computing device 600 such as the device 500 described with respect to FIGS. 5A and 5B. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of computing approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 7:
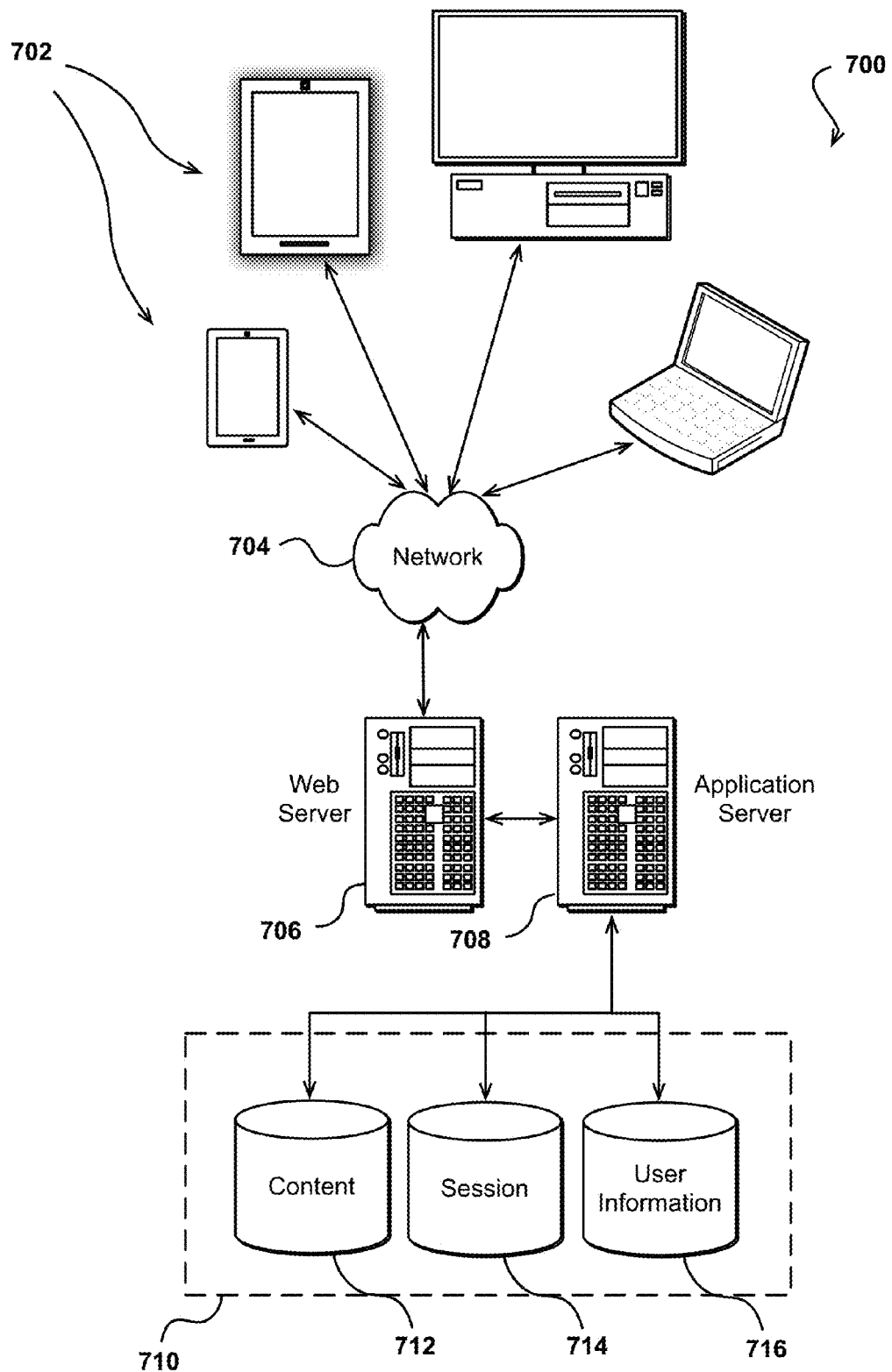
FIG. 7 illustrates an example of an environment for implementing aspects in accordance with various embodiments of the subject technology.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   generating an image at a mobile computing device using a camera;
   determining features corresponding to a first word and a second word of text in the image;
   generating, on the mobile computing device, mobile optical character recognition (OCR) data including mobile OCR results associated with the first word by performing OCR on the features associated with the first word;
   determining an OCR latency of the mobile computing device;
   determining an OCR accuracy of the mobile computing device;
   sending the image to a remote device to perform remote OCR on the image;
   causing the mobile OCR results to be displayed on the mobile computing device, including causing a first textual output associated with the first word to be displayed;
   receiving remote OCR data, wherein the remote OCR data includes remote OCR results from the remote device associated with the second word;
   determining differences between the mobile OCR data and the remote OCR data;
   generating hybrid OCR results based on the differences by merging the mobile OCR data and the remote OCR data, including generating hybrid OCR results that include a second textual output associated with the second word and wherein the generating occurs based on at least one of the OCR latency being less than a threshold amount of time or the OCR accuracy being less than an accuracy threshold; and
   causing the hybrid OCR results to be displayed on the mobile computing device, including causing the first textual output to be displayed with the second textual output.

2. The computer-implemented method of claim 1, wherein merging the mobile OCR data and the remote OCR data comprises adding the second textual output from the remote OCR results to the first textual output from the mobile OCR results to create a textual list of outputs to be displayed.

3. The computer-implemented method of claim 1, wherein merging the mobile OCR data and the remote OCR data comprises:
   comparing a first mobile OCR result associated with the first word from the mobile OCR results to a second remote OCR result associated with the first word from the remote OCR results to determine letters from the second remote OCR result with higher confidence scores than letters of the first mobile OCR result; and
   replacing the letters of the first mobile OCR result from the mobile OCR results with the letters of the second remote OCR result with the higher confidence scores to create an updated textual output associated with the first word to be displayed.

4. A system comprising:
   at least one processor; and
   a memory device including instructions that, when executed by the at least one processor, cause the at least one processor to:
   receive an image at the system;
   determine an OCR latency of the system;
   determine an OCR accuracy of the system;
   send the image to a remote device to perform remote optical character recognition (OCR) on the image;
   generate mobile OCR data, wherein the mobile OCR data comprises mobile OCR results;
   receive remote OCR data, wherein the remote OCR data includes remote OCR results from the remote device;
   determining differences between the mobile OCR data and the remote OCR data;
   generate hybrid OCR results based at least in part on:
      the differences,
      the mobile OCR data,
      the remote OCR data, and
      at least one of the OCR latency being less than a threshold amount of time or the OCR accuracy being less than an accuracy threshold; and
   cause the hybrid OCR results to be displayed.

5. The system of claim 4, wherein to generate the OCR data, the instructions further cause the at least one processor to:
   determine features corresponding to text in the image; and
   perform OCR on the features of the image to provide the mobile OCR data including the mobile OCR results.

6. The system of claim 4, wherein merging the mobile OCR data and the remote OCR data comprises:
   adding a first mobile OCR result associated with a first word from the mobile OCR results to a second remote OCR result associated with a second word from the remote OCR results to create a list of OCR results to be displayed.

7. The system of claim 4, wherein merging the mobile OCR data and the remote OCR data comprises:
   comparing a first mobile OCR result associated with a first word from the mobile OCR results to a second remote OCR result associated with the first word from the remote OCR results to determine letters from the second remote OCR result with higher confidence scores than letters of the first mobile OCR result; and
   replacing the letters of the first mobile OCR result from the mobile OCR results with the letters of the second remote OCR result with the higher confidence scores to create an updated OCR result associated with the first word to be displayed.

8. The system of claim 4, wherein merging the mobile OCR data and the remote OCR data comprises:
comparing a first mobile OCR result associated with a first word from the mobile OCR results to a second remote OCR result associated with a second word from the remote OCR results to determine whether the second remote OCR result associated with the second word has a higher confidence score than the first mobile OCR result associated with the first word; and
replacing the first word of the first mobile OCR result from the mobile OCR results with the second word of the second remote OCR result with the higher confidence score to create an updated OCR result to be displayed.

9. The system of claim 4, wherein the memory device includes further instructions that cause the at least one processor to:
before sending the image to the remote device to perform OCR, determine whether operational factors are satisfied.

10. The system of claim 9, wherein to determine whether the operational factors are satisfied further causes the at least one processor to:
determine whether an indication of network strength is above a threshold amount of network strength at the system, wherein the indication of network strength represents an amount of signal strength from the system to a network;
responsive to determining that the indication of network strength is above the threshold amount of network strength, determine whether a battery level of the system is above a threshold amount of battery level;
responsive to determining that the battery level of the system is above the threshold amount of battery level, determine whether a user preference indicating a preference for solely performing OCR on the system or solely performing OCR on the remote device exists; and
responsive to determining that the user preference indicating the preference for solely performing OCR on the system or solely performing OCR on the remote device exists, indicate that the operational factors are satisfied.

11. The system of claim 10, wherein the instructions further cause the at least one processor to:
responsive to determining that the indication of network strength is below the threshold amount of network strength, perform OCR on the image at the system.

12. The system of claim 10, wherein the instructions further cause the at least one processor to:
responsive to determining that the battery level of the system is below the threshold amount of battery level, send the image to the remote device to perform OCR on the image.

13. A non-transitory computer-readable medium including instructions stored therein that, when executed by at least one computing device, cause the at least one computing device to:
receive an image at the at least one computing device;
determine an OCR latency of the at least one computing device;
determine an OCR accuracy of the at least one computing device;
send the image to a remote device to perform remote optical character recognition (OCR) on the image;
generate mobile OCR data, wherein the mobile OCR data comprises mobile OCR results;
receive remote OCR data, wherein the remote OCR data includes remote OCR results from the remote device;
determining differences between the mobile OCR data and the remote OCR data;
generate hybrid OCR results based at least in part on:
the differences,
the mobile OCR data,
the remote OCR data, and
at least one of the OCR latency being less than a threshold amount of time or the OCR accuracy being less than an accuracy threshold; and
cause the hybrid OCR results to be displayed.

14. The non-transitory computer-readable medium of claim 13, wherein to generate the OCR data, the instructions further cause the at least one computing device to:
determine features corresponding to text in the image; and
perform OCR on the features of the image to provide the mobile OCR data including the mobile OCR results.

15. The non-transitory computer-readable medium of claim 13, wherein merging the mobile OCR data and the remote OCR data comprises:
adding a first mobile OCR result associated with a first word from the mobile OCR results to a second remote OCR result associated with a second word from the remote OCR results to create a list of OCR results to be displayed.

16. The non-transitory computer-readable medium of claim 13, wherein merging the mobile OCR data and the remote OCR data comprises:
comparing a first mobile OCR result associated with a first word from the mobile OCR results to a second remote OCR result associated with the first word from the remote OCR results to determine letters from the second remote OCR result with higher confidence scores than letters of the first mobile OCR result; and
replacing the letters of the first mobile OCR result from the mobile OCR results with the letters of the second remote OCR result with the higher confidence scores to create an updated OCR result associated with the first word to be displayed.

17. The non-transitory computer-readable medium of claim 13, wherein merging the mobile OCR data and the remote OCR data comprises:
comparing a first mobile OCR result associated with a first word from the mobile OCR results to a second remote OCR result associated with a second word from the remote OCR results to determine whether the second remote OCR result associated with the second word has a higher confidence score than the first mobile OCR result associated with the first word; and
replacing the first word of the first mobile OCR result from the mobile OCR results with the second word of the second remote OCR result with the higher confidence score to create an updated OCR result to be displayed.

18. The non-transitory computer-readable medium of claim 13, wherein the instructions further cause the at least one computing device to:
before sending the image to the remote device to perform OCR, determine whether operational factors are satisfied.

19. The non-transitory computer-readable medium of claim 18, wherein to determine whether the operational factors are satisfied further causes the at least one computing device to:
determine whether an indication of network strength is above a threshold amount of network strength at the at least one computing device, wherein the indication of network strength represents an amount of signal strength from the at least one computing device to a network;

responsive to determining that the indication of network strength is above the threshold amount of network strength, determine whether a battery level of the at least one computing device is above a threshold amount of battery level;

responsive to determining that the battery level of the at least one computing device is above the threshold amount of battery level, determine whether a user preference indicating a preference for solely performing OCR on the at least one computing device or solely performing OCR on the remote device exists; and responsive to determining that the user preference indicating the preference for solely performing OCR on the at least one computing device or solely performing OCR on the remote device exists, indicate that the operational factors are satisfied.

20. The non-transitory computer-readable medium of claim 19, wherein the instructions further cause the at least one computing device to:

responsive to determining that the indication of network strength is below the threshold amount of network strength, perform OCR on the image at the at least one computing device.

* * * * *